Figure 1:
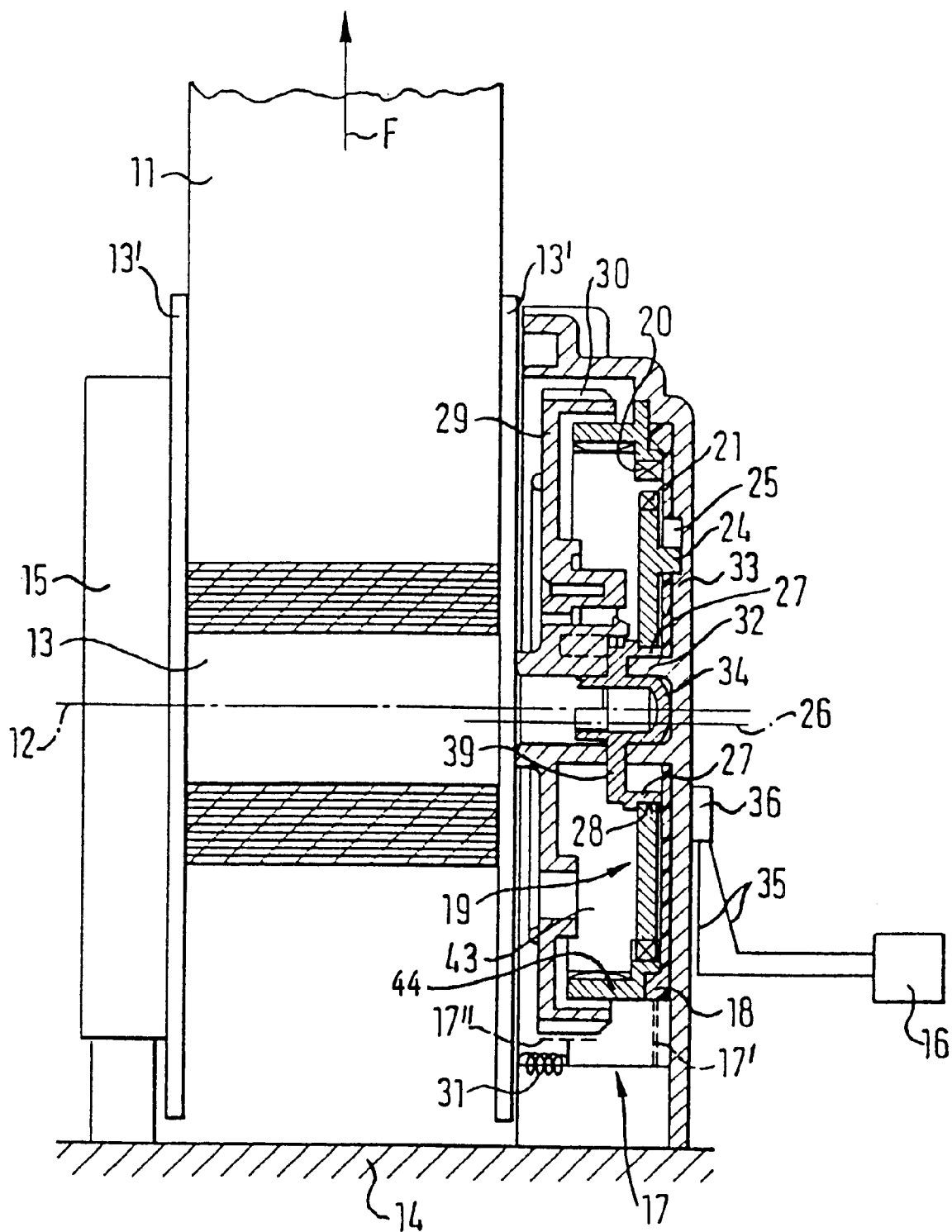

United States Patent [19]
Kopetzky et al.

[11] Patent Number: 6,109,556
[45] Date of Patent: Aug. 29, 2000

[54] SAFETY BELT ARRANGEMENT FOR MOTOR VEHICLES

[75] Inventors: Robert Kopetzky, Lonsee; Georg Bannert, Ummendorf, both of Germany; Harry Hanna, Maralin, Ireland

[73] Assignee: Takata (Europe) Vehicle Safety Technology GmbH, Ulm, Germany

[21] Appl. No.: 08/975,992

[22] Filed: Nov. 21, 1997

[30] Foreign Application Priority Data

Nov. 22, 1996 [DE] Germany ............... 196 48 515

[51] Int. Cl.⁷ ................................................ B60R 22/415
[52] U.S. Cl. ........................ 242/382.2; 200/61.58 B
[58] Field of Search ..................... 242/382.2, 382.4; 280/806; 297/478, 480; 200/61.58 B

[56] References Cited

U.S. PATENT DOCUMENTS

| | | |
|---|---|---|
| 2,979,282 | 4/1961 | Barecki . |
| 3,880,379 | 4/1975 | Booth .................... 200/61.58 B |
| 4,555,075 | 11/1985 | Schmidt et al. . |
| 4,565,338 | 1/1986 | Takada . |
| 4,566,649 | 1/1986 | Petersen .................... 242/382.2 |
| 4,597,546 | 7/1986 | Yamamoto et al. ............ 242/382.2 |
| 4,729,523 | 3/1988 | Saitou et al. . |
| 4,817,885 | 4/1989 | Matsumoto ................ 242/382.2 |
| 4,948,066 | 8/1990 | Matsumoto et al. ........... 242/382.2 |
| 5,257,754 | 11/1993 | Hishon .................... 242/382.2 |
| 5,294,070 | 3/1994 | Sugano et al. .............. 242/382.2 |
| 5,507,447 | 4/1996 | Corrion et al. .............. 242/382.2 |
| 5,518,197 | 5/1996 | Gray . |
| 5,816,523 | 10/1998 | Hori ...................... 242/382.4 |

FOREIGN PATENT DOCUMENTS

| | | |
|---|---|---|
| 0 298 123 | 1/1989 | European Pat. Off. . |
| 0 553 458 | 8/1993 | European Pat. Off. . |
| 0 761 513 | 3/1997 | European Pat. Off. . |
| 38 09 007 | 10/1988 | Germany . |
| 90 15 534 | 4/1992 | Germany . |
| 42 07 579 | 9/1993 | Germany . |
| 2 131 279 | 6/1984 | United Kingdom . |

*Primary Examiner*—John M. Jillions
*Attorney, Agent, or Firm*—Foley & Lardner

[57] ABSTRACT

A safety belt arrangement for motor vehicles, comprising at least one safety belt, which is wound to a greater or lesser degree around a belt reel which is rotatably secured about an axis of rotation to the vehicle chassis and which is biased in the belt winding up direction by a retraction mechanism and which also has, in particular, a draw-out blocking mechanism which blocks rapid drawing out of the safety belt and/or further drawing out of the safety belt in the event of accident dependent accelerations of the motor vehicle, wherein a ratchet wheel is rotationally fixedly coupled to the belt reel and cooperates with a latching pawl fixed to the housing, which can be engaged and disengaged in such a way that when the latching pawl is engaged into the ratchet wheel a rolling up movement of the belt reel by the spring retraction mechanism is possible but not, however, a pulling out of the safety belt; and wherein the latching pawl can be engaged and disengaged, with respect to the ratchet wheel, by an actuating element, in particular by a cam ring, via a step-down transmission in such a way that the latching pawl (a) is disengaged when the safety belt is at least substantially fully drawn in, and (b) is engaged when the safety belt is at least substantially fully drawn out.

14 Claims, 4 Drawing Sheets

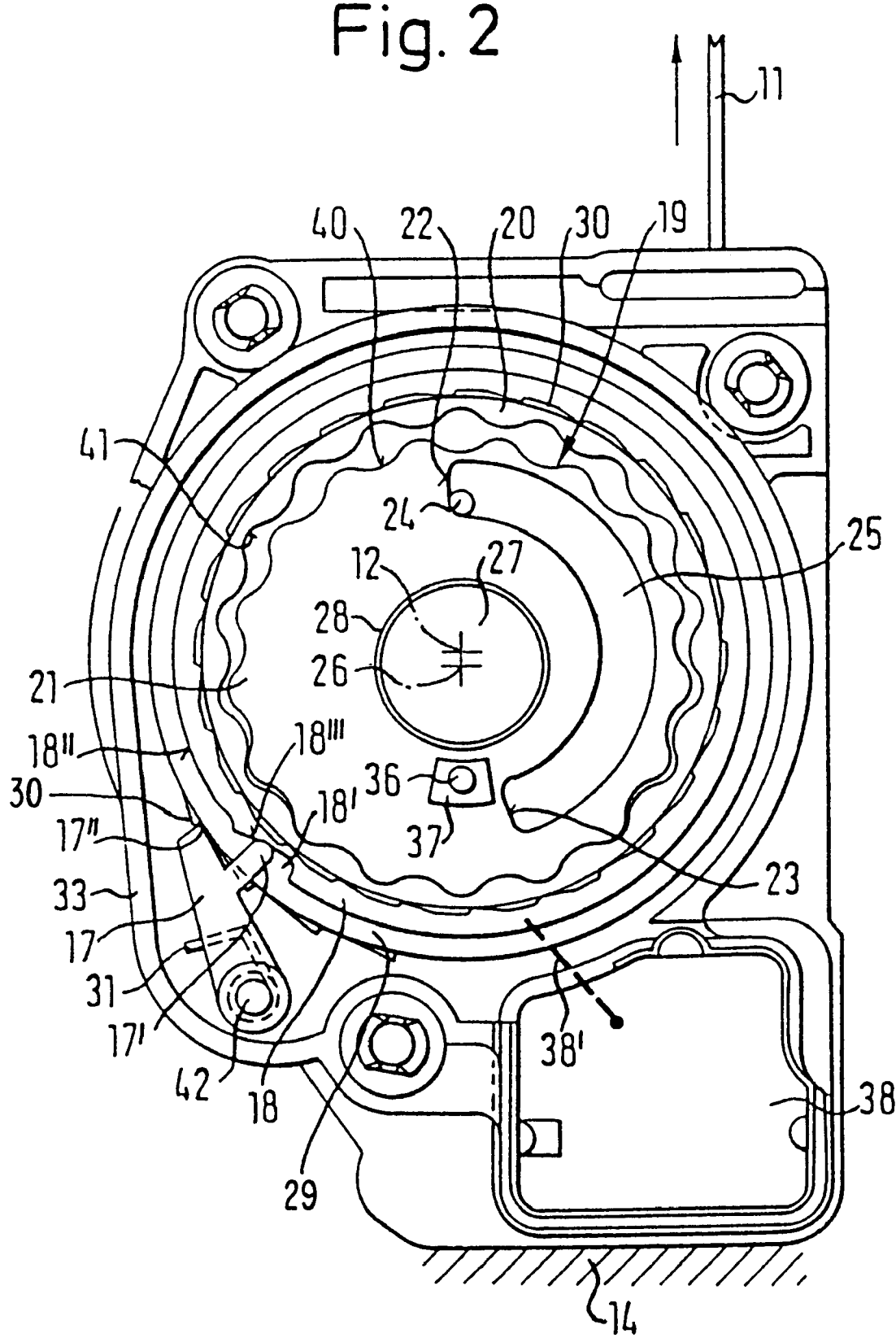

SAFETY BELT ARRANGEMENT FOR MOTOR VEHICLES

The invention relates to a safety belt arrangement for motor vehicles.

If children are belted into a motor vehicle with such safety belt arrangements, the danger exists that the children will pull the belt out further as a game during the journey, whereby the safety retaining function of the belt is impaired or indeed set out of operation. With adults it must also be expected that they will, for relief, occasionally pull the belt further out during a journey than is permissible if the required retention safety is to be ensured.

The object of the present invention is thus to provide a safety belt arrangement of the initially named kind which has a simple and in particular compact construction and prevents further drawing out of the safety belt after a person has been belted in, with it nevertheless being possible for the safety belt to be fully drawn out from its rolled up position without problem during a subsequent belting in procedure.

In order to satisfy this object there are provided the features of the as disclosed in the specification below.

The concept underlying the invention is to be seen in the fact that, when the safety belt is at least substantially complete drawn out, a switching procedure is triggered which subsequently only permits a reeling in of the belt, but does not initially permit it to be drawn out again. If the safety belt is subsequently reeled up again into the rest position by the spring-driven retraction mechanism, after the person has released the safety belt, then a further switching procedure is automatically triggered. This further switching procedure releases the block preventing the pulling out of the belt so that it is then possible to again draw the safety belt out fully. In other words, the extreme positions of the safety belt, namely the fully drawn out position and the fully reeled in position are exploited to trigger opposite switching procedures, which either prevent further drawing out of the safety belt, which is reeled in to a greater or lesser degree, or release the safety belt for renewed drawing out.

Through the use of a cam ring in conjunction with a high-ratio step-down transmission, a particularly compact and operationally reliable arrangement is ensured. The step-down transmission should be so designed, in accordance with the invention, that the entire draw-out range of the safety belt corresponds to less than one rotation of the output shaft of the step-down transmission.

A particularly advantageous and constructionally compact embodiment which is simple to manufacture is characterized by a second embodiment of the invention. Here a harmonic transmission is used in order to achieve the required substantial step-down of the motion and to achieve a particularly elegant constructional solution.

Further advantageous developments of the invention are characterized by further embodiments of the invention.

In accordance with one embodiment of the invention, signal generator/signal receiver pairs can be arranged at the cam ring and at the housing surrounding the latter, with the one switching position of the cam ring delivering a first signal, and with the other position delivering a second signal at the receiver.

In a display device connected to the receiver it is then possible to distinguish between the position in which the safety belt can be freely drawn out and the position in which the renewed drawing out of the safety belt is blocked. In this way a display device for problem-free belting up can be made available for the driver or for the other occupants of the vehicle. The last named embodiment is admittedly preferably used in conjunction with the renewed pull-out blocking action of the invention but can, however, also be used on its own, and indeed always in conjunction with the harmonic transmission of the invention and its special further developments, which can be seen from the various claims.

A particularly compact arrangement of the draw-out blocking mechanism which becomes active when the belt is pulled out quickly can be found in another embodiment of the invention.

The ratchet wheel of the invention can, in accordance with yet another embodiment of the invention, simultaneously also bring about the required drawout blocking action in the event of an accident dependent acceleration, and this is important if the vehicle occupant has not fully drawn out the belt prior to belting up, so that the blocking action preventing renewed drawing out is not switched on.

The measure of claim 15 also serves for a compact arrangement.

A further concept of the invention can be found in a further embodiment of the invention. In accordance with this embodiment a harmonic transmission is used for the determination of the position of the more or less drawn out safety belt. An angular position of the control gear can be exploited in the most diverse manners for the display of the degree to which a safety belt is pulled out and/or to trigger functions in dependence on the degree to which the safety belt is pulled out. By way of example switches can be actuated in specific angular positions which trigger a display and/or switching functions.

The invention will be described in the following by way of example and with reference to the drawings, in which are shown:

FIG. 1 a partly sectioned view of the belt reeling device of a safety belt arrangement in accordance with the invention in a plane containing the axis of rotation and the pull-out direction, FIG. 2 a partly sectioned side view of the subject of FIG. 1, and FIG. 3a–3d simplified views analogous to FIG. 2, with different drawn out or drawn in lengths of the safety belt.

In accordance with FIGS. 1 and 2, a safety belt arrangement in accordance with the invention is secured to the vehicle chassis 14 and has a belt reel 13 rotatable about a transverse axis of rotation 12. The belt reel has two guide flanges 13'. A safety belt 11, which can be drawn out in the direction of the arrow F, is wound to a greater or lesser degree on the belt reel. A spring-driven retraction mechanism 15, which is only schematically illustrated, is located at one end face of the belt reel 13 and permanently exerts a reeling in torque on the belt reel.

A substantially pot-like housing 33 fixed to the chassis is provided at the end face of the belt reel 13 remote from the spring-driven retraction mechanism 15 and is open towards the adjoining flange 13'. A central bearing spigot 34 of the belt reel 13 concentric to the axis of rotation 12 extends into the housing 33. A hollow bearing projection 32 is provided at the inner wall of the housing 33 to accommodate the end of the bearing spigot 34 remote from the belt reel 13. The inner space of the hollow bearing projection 32 is likewise concentric to the axis of rotation 12 and receives in a sliding seat the bearing spigot 34, which is rotationally fixedly connected to the belt reel 13. An eccentric disc 39 extends radially from the bearing spigot 34 directly outside of the bearing projection 32 and carries at its periphery a hollow, eccentric bearing spigot 27, which extends in the direction towards the housing 33. The central axis 26 of the eccentric bearing hollow spigot 27 extends parallel to and at a small distance from the axis of rotation 12.

The eccentric hollow bearing spigot 27 engages axially over the bearing projection 32 without contact or with contact only at a peripheral location and thereby extends in a sliding seat into a central bearing bore 28 of a circular, ringlike, disc-shaped control gear 21. The control gear has a central axis which coincides with the central axis 26 of the eccentric bearing spigot 27, and is provided at its outer periphery with a wave-shaped toothed arrangement 40 which has a total of 17 wave teeth uniformly distributed over the periphery.

An inner toothed ring 20 fixed to the housing and having a larger diameter extends around the control gear 21 and has a wave shaped toothed arrangement 41 complementary to the outer toothed arrangement 40 of the control gear 21 but which consists of 18 teeth. At one peripheral side, the control gear 21 and the inner toothed ring 20 are respectively in meshing engagement, whereas the diametrically oppositely disposed toothed arrangements 40, 41 do not contact each other so that the control gear 21 can roll off on the inner toothed ring 20 when driven by the eccentric hollow bearing spigot 27.

A disc-shaped cam ring 18 is rotatably arranged on the bearing projection 32 parallel to the control gear 21, between the latter and the flat side of the housing 33. The cam ring 18 has, in accordance with FIG. 2, a peripheral slot 25 extending over approximately 180° concentric to the axis of rotation 12, with the radial width of the peripheral slot corresponding to the eccentricity of the central axis 26. The disc-like cam ring 18 is rotatable about the axis of rotation 12, through the rotary mounting on the bearing projection 32.

In accordance with FIG. 2 the cam ring 18 has a circular peripheral surface 18" which is interrupted at one peripheral position by a radially inwardly projecting engagement recess 18' with a cam track like inclined surface 18''' being provided between the deepest point of the engagement recess and the normal peripheral surface 18".

A latching pawl or blocking pawl 17 is hingedly arranged on the housing 33 about a pivot axis 32 extending parallel to the axis of rotation 12, substantially radially outside of the engagement recess 18". The blocking pawl has a control projection 17' which, in the rotary position of the cam ring 18 of FIG. 2, engages into the engagement recess 18'. The blocking pawl 17 has a latching edge 17", which latches in accordance with FIG. 2 into the ratchet teeth 30 of a ratchet wheel 29, which is rotationally fixedly connected to the belt reel 13 coaxial to the latter. The ratchet teeth 30 are so directed that only the reeling in of the safety belt 11, but not the pulling out of the safety belt, is possible from the latched position shown in FIG. 2.

The open pot-like design of the ratchet wheel 29 is open towards the control gear 21. A hollow cylindrical projection 44 of the inner toothed ring 20, i.e. of the housing 33, concentric to the axis of rotation 12, projects into the ratchet wheel 29 from the open side. A belt sensor mass 43 is active between the hollow cylindrical projection 44 and the bearing spigot 34 and blocks the further drawing out of the safety belt when drawn out too rapidly. Thus, the hollow cylindrical projection 44 extends radially outwardly and axially in the direction of the belt reel 13 from the inner toothed ring 20 or the housing 33, and a belt sensor mass 43 is arranged in its interior, which cooperates radially outwardly with the projection 44 and radially inwardly with the bearing spigot 34. This arrangement results in a particularly compact design.

The disc-like control gear 21 contacts the end face of the belt sensor mass 43 remote from the ratchet wheel 29 and encloses, together with the flat side of the housing 33, the cam ring 18 which is formed as a narrow disc. The constructional arrangement which can be seen from FIGS. 1 and 2 is thus of particular advantage.

The latching pawl 17 is resiliently biased by a wound spring 31 towards the ratchet gear 29 and the periphery of the cam ring 18.

In FIG. 1 the latching pawl 17 with the control projection 17' and also the latching edge 17" is only schematically illustrated in order to illustrate the mutual cooperation with the ratchet wheel 29 and the cam ring 18.

A pin 24 forming a counterabutment extends, in accordance with FIGS. 1 and 2, from the disc-like control gear 21 into the peripheral slot 25 of the cam ring 18, with the ends of the peripheral slot 25 extending substantially radially and each representing a respective abutment 22 and 23 for the pin 24.

In accordance with FIG. 2 an acceleration sensor 38 is also provided, which brings a pawl mechanism 38', which is only schematically illustrated, into engagement with the ratchet teeth 30 in the event of accident dependent accelerations, in order to prevent a further drawing out of the safety belt 11 in this way. The ratchet wheel 29 is thus exploited here for a double purpose.

Further particulars of the described safety belt apparatus can be seen from the following functional description with respect to the FIGS. 1, 2 and 3a, 3b, 3c and also 3d.

Figure 3A:
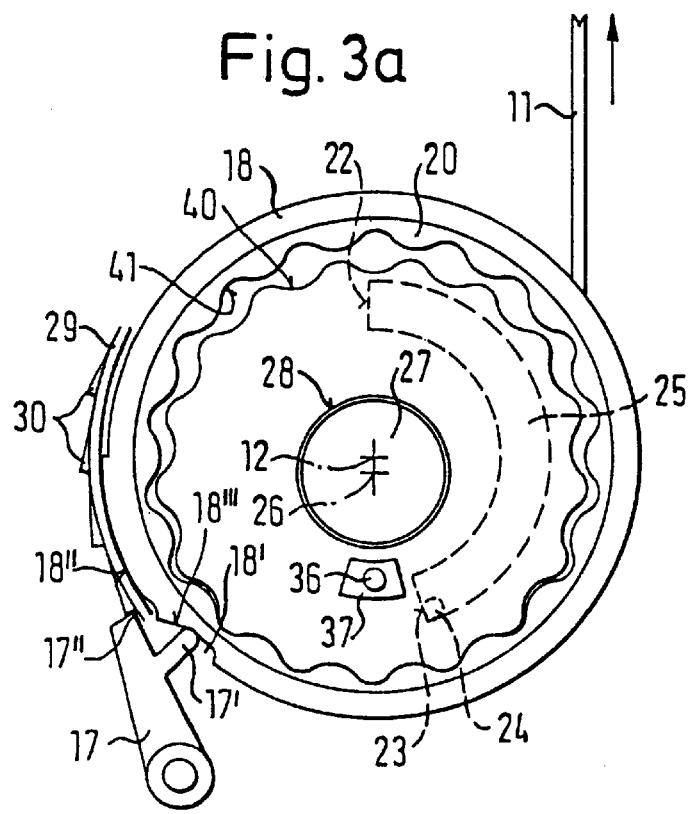

FIG. 3a shows the safety belt arrangement in the fully drawnout state of the safety belt 11 in the direction of the arrow. In this position the pin 24 abuts against the front abutment 23 of the slot 25 in the clockwise sense, whereby the cam ring 18 is turned in the clockwise sense until the control projection 17' of the latching pawl 17 latches into the engagement recess 18' at the periphery of the cam ring 18. In this way the latching edge 17" of the latching pawl 17 enters into the region of the ratchet teeth 30 of the ratchet wheel 29.

Figure 3B:
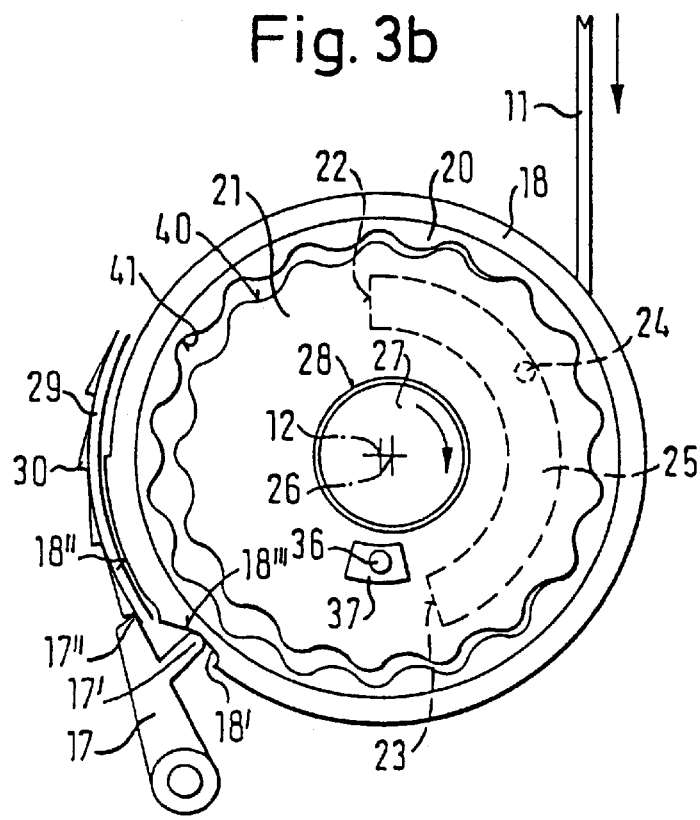

If the safety belt 11 is now placed around the occupant and secured at its free end in the belt lock, then the retraction spring mechanism 15 (FIG. 1) reels in the safety belt 11 by a corresponding rotation of the belt reel 13 in the arrow direction of FIG. 3b until the safety belt 11 contacts the occupant in the desired manner. During this the eccentric bearing spigot 27 rotates in the clockwise sense and the control gear 21 rotatably sitting on it rolls off on the inner toothed ring 20 so that it executes numerous rotations about the axis of rotation 12. As a result of the lower number of teeth of the control gear 21 relative to the inner toothed ring 20, the control gear 21 rotates gradually relative to the axis of rotation 12 in the counter-clockwise sense so that the pin 24, starting from the position of FIG. 3a, moves slowly in the counter-clockwise sense within the peripheral slot 25, for example up to the position of FIG. 3b. It is assumed that in the partially drawn in position of FIG. 3b the safety belt 11 lies sufficiently tightly against the belted in occupant, whereby a further drawing in of the safety belt 11 is prevented.

If now the occupant attempts to pull out the safety belt 11 against the arrow direction in FIG. 3b, then this is prevented by the latching pawl 17 which engages into one of the ratchet teeth 30.

If, however, the safety belt 11 is released by the occupant, then the spring-driven retraction mechanism 15 can further reel in the safety belt 11 in the direction of the arrow in FIG. 3b, with the latching edge 17" of the latching pawl 17 jumping over the correspondingly shaped ratchet teeth 30. In this arrangement the control gear 21 rolls off further on the inner toothed ring 20, with the pin 24 moving further in the counter-clockwise sense, starting from the position in FIG. 3b, until it finally comes into contact in the almost fully reeled in position of FIG. 3c at the end face abutment surface 22 of the cam ring 18, and moves the latter with it in the peripheral direction into the position which is evident from FIG. 3d. During this the control projection 17' slides along the inclined surface 18''' of the engagement recess 18" out of the latter and comes into contact with the radially further outwardly disposed normal peripheral surface 18' of the cam ring 18. The latching edge 17" comes out of engagement with the latched teeth 30 of the ratchet wheel 29 so that a renewed drawing out of the safety belt 11 in the direction of the arrow F is possible unhindered by the latching pawl 17. This drawing out can then proceed until the pin 24 reaches the opposite abutment surface 23 of the peripheral slot 25, whereupon the cam ring 18 is turned by the pin 24 in the clockwise sense until the control projection 17' of the latching pawl 17 falls anew into the engagement recess 18" and thus the latching edge 17" enters again into engagement with the ratchet teeth 30. Then a drawing in of the safety belt, not, however, an intermediate drawing out of the safety belt, is possible.

In accordance with the drawing a Hall switch 36 can be provided at the housing 33, which cooperates with a magnetic layer or lining 37 provided on the cam ring 18. Lines 35 (FIG. 1) lead from the Hall switch 36 to an only schematically illustrated display device 16. The magnetic layer 37 could also be provided on the control wheel 21. The magnetic layer 37 and the Hall switch 36 can be regarded as a signal transducer and signal receiver.

Figure 3C:
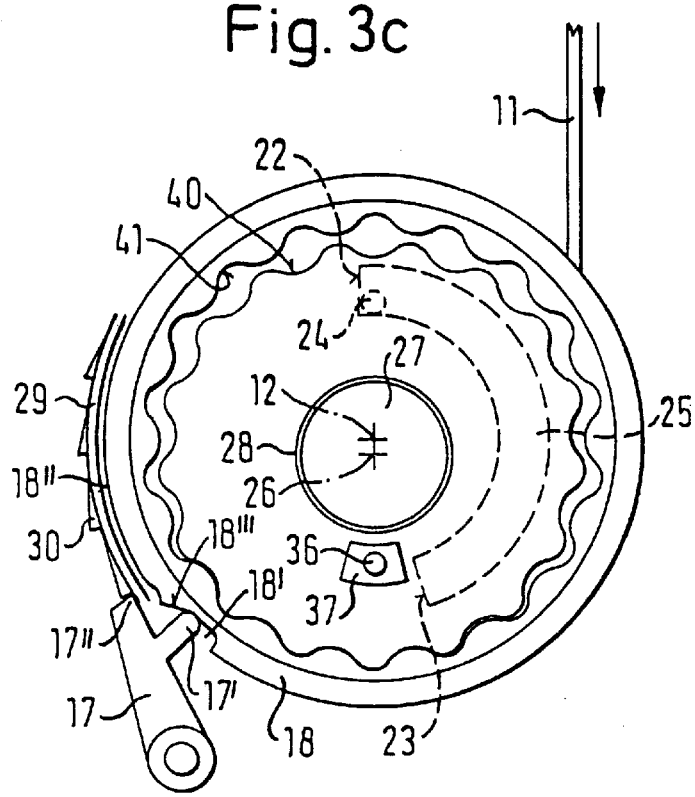

As one can see from the FIGS. 3a to 3c, the Hall switch 36 and the magnetic layer 37 are aligned with one another when the latching pawl 17 is latched into the engagement recess 18", whereupon the display device 16 transmits a signal which shows the occupant that the safety belt arrangement of the invention is in the secure switch position, in which only a drawing in, but not, however, a drawing out of the safety belt 11 is possible.

Figure 3D:
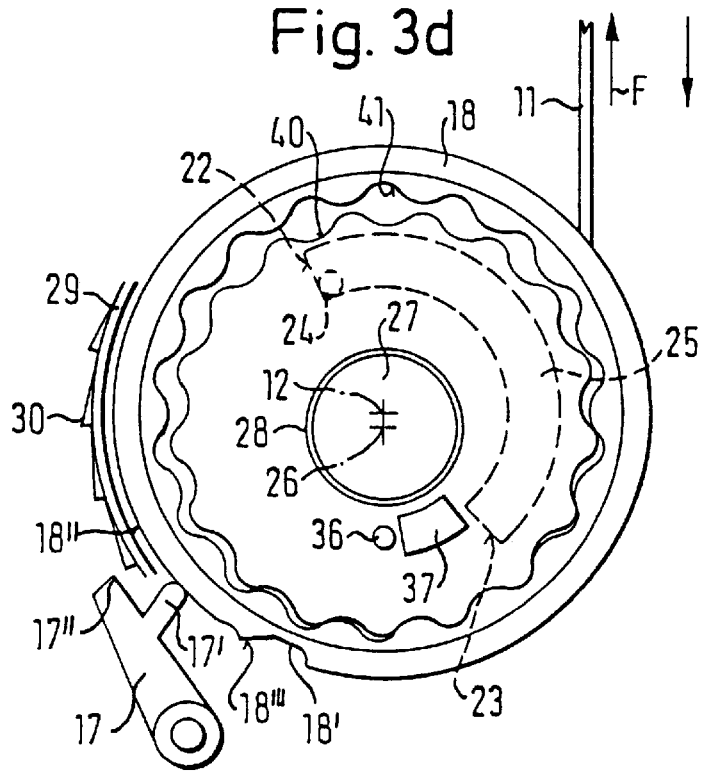

In the fully drawn in position of the safety belt 11 of FIG. 3d, the Hall switch 36 and the magnetic layer 37 come out of their alignment with one another, whereby the Hall switch 36 is switched over into its other switch position and the display device 16 now transmits either no signal, or a different signal, which points out to the occupant that the safety belt arrangement is not in the secure switch position where a drawing out of the safety belt from its specific position on is not possible.

Even if the display device 16 is preferably used in conjunction with the cam ring 18, it could, however, also be provided without the latter, i.e. the harmonic transmission used in accordance with the invention (such as step-down transmission 19) could also be directly used to actuate a switch, i.e. without the presence of a cam ring 18. It is in any event important that a harmonic transmission ensuring a substantial step-down ratio is present between the belt reel 13 and the indicator or release mechanism.

The maximum pivotal movement of the cam ring lies— as can be seen from a comparison between the FIGS. 3c and 3d—at around 25°. It can also lie at other angles between 10 and 30°.

The subject matter of German Patent Application 196 48 515.0 filed Nov. 22, 1996, is hereby incorporated by reference.

What is claimed is:

1. Safety belt arrangement for motor vehicles, comprising at least one safety belt, which is wound to a greater or lesser degree around a belt reel which is rotatably secured about an axis of rotation to the vehicle chassis, and which is biased in the belt winding up direction by a retraction mechanism and which also has, in particular, a draw-out blocking mechanism which blocks rapid drawing out of the safety belt and/or further drawing out of the safety belt in the event of accident dependent accelerations of the motor vehicle, wherein a ratchet wheel is rotationally fixedly coupled to the belt reel and cooperates with a latching pawl fixed to the housing, which can be engaged and disengaged in such a way that when the latching pawl is engaged into the ratchet wheel a rolling up movement of the belt reel by the retraction mechanism is possible but not, however, a pulling out of the safety belt; and wherein the latching pawl can be engaged and disengaged, with respect to the ratchet wheel, by an actuating element, in particular by a cam ring, via a step-down transmission in such a way that the latching pawl:

is disengaged when the safety belt is at least substantially fully drawn in, and is engaged when the safety belt is at least substantially fully drawn out, wherein the step-down transmission has an inner toothed ring fixed to the housing and concentric to the axis of rotation, a control gear which meshes with the inner toothed ring and has a smaller diameter such that it can roll off on the inner toothed ring and also has a different number of teeth in comparison to the number of teeth of the inner toothed ring;

wherein an eccentric bearing is provided between the central axis of the control gear which is eccentric to the axis of rotation of the belt reel and the axis of rotation of the belt reel, and wherein the inner toothed ring and the control gear are so formed that the control gear rotates through approximately a half turn when the belt is transferred from the fully drawn in to the fully drawn out condition.

2. Apparatus in accordance with claim 1, wherein two abutments (22, 23) provided at an angular spacing on the control gear (21) cooperate with a counterabutment (24) on the cam ring (18) in such a way that the cam ring (18) adopts a pull-out blocking position when the belt (11) is at least approximately fully drawn out and adopts a draw-out release position when the belt (11) is at least approximately fully drawn in.

3. Apparatus in accordance with claim 2, characterized in that a pin (24) forming the counterabutment extends from the cam ring (18) at a radial distance from the central axis (12) axially into a peripheral slot (25) of the cam ring (18), the slot having a radial width which is so large that the pin (24) can move freely in the radial direction in the slot (25) on rotation of the control gear (21), with the peripheral ends of the peripheral slot forming the abutments (22, 23).

4. Apparatus in accordance with claim 1, characterized in that the eccentric bearing comprises a hollow bearing spigot (27) which extends from a part (38) rotatable with the belt reel (13) eccentrically to the axis of rotation of the belt reel (13) axially into a central bearing bore (28) of the control gear (21).

5. Apparatus in accordance with claim 1, characterized in that the ratchet wheel (29) which is rotationally fixedly coupled to the belt reel (13) is arranged on the axis of rotation (12) of the belt reel (13), with the latching pawl (17) engaging into the ratchet wheel (19), and being biased towards the engaged position.

6. Apparatus in accordance with claim 5, characterized in that a control projection (17') is also provided on the latching pawl (17) and cooperates with the periphery of the cam ring (18).

7. Apparatus in accordance with claim 6, characterized in that an engagement recess (18') is provided in the periphery of the cam ring (18) and in that the latching pawl (17) is located in engagement with the ratchet teeth (30) of the ratchet wheel (29) when the control projection (17') has engaged into the engagement recess (18'), and is located out of engagement with the ratchet teeth (30) of the ratchet wheel (29) when the control projection (17') is located outside of the engagement recess (18') on the normal periphery (18") of the cam ring (18).

8. Apparatus in accordance with claim 7, characterized in that the engagement recess merges via an inclined surface (18''') into the normal periphery (18") of the cam ring (18), which lies radially further outwardly.

9. Apparatus in accordance with claim 1, characterized in that the cam ring (18) is rotatably mounted on a hollow bearing projection (32) of a housing (33), which is in particular of pot-like shape, and which is concentric to the axis of rotation (12), with a bearing spigot (34) which is concentric to the belt reel (12) and rotationally fixedly connected thereto engaging, in the inner space of the housing (33); and in that the eccentric bearing comprises a spigot (27) of larger diameter arranged on the central bearing spigot (34) and which engages into a bearing bore (28) complementary to it in the center of the control gear (21).

10. Apparatus in accordance with claim 1, characterized in that a signal generator, in particular a magnet segment (37) is provided at the cam ring (18) and a signal receiver cooperating with it, in particular a Hall switch (36) is provided at the housing (33) and is connected to a belt-up indicator device (16).

11. Apparatus in accordance with claim 1, characterized in that the draw-out blocking mechanism has an acceleration sensor, in particular a transverse acceleration sensor (38) which cooperates with a component which is rotationally fixedly connected to the belt reel, in particular via a pawl mechanism (38'), with the ratchet wheel (29) in such a way that when accident dependent accelerations occur, the further draw-out of the belt (11) is blocked.

12. Safety belt arrangement for motor vehicles having at least one safety belt (11), which is wound to a greater or lesser degree around a belt reel (13) which is rotatably secured about an axis of rotation (12) to the vehicle chassis (14) and which is biased in the belt winding up direction, by a retraction mechanism (15), and which also has in particular a draw-out blocking mechanism (38, 43) which blocks further drawing out of the safety belt (11) only through rapid drawing out of the safety belt and/or with accident dependent accelerations of the motor vehicle, wherein a ratchet wheel is rotationally fixedly coupled to the belt reel and cooperates with a latching pawl fixed to the housing, which can be engaged and disengaged in such a way that when the latching pawl is engaged into the ratchet wheel a rolling up movement of the belt reel by the spring retraction mechanism is possible but not, however, a pulling out of the safety belt; and wherein the latching pawl can be engaged and disengaged, with respect to the ratchet wheel, by an actuating element, in particular by a cam ring, via a step-down transmission in such a way that:

the latching pawl is disengaged when the safety belt is at least substantially fully drawn in, and is engaged when the safety belt is at least substantially fully drawn out, wherein a control gear (21) is connected to the belt reel (13) via an eccentric transmission (34, 27, 28) and has at its periphery a toothed arrangement (40) which is surrounded by an inner toothed ring (20) fixed to the housing and of larger diameter and with a complementary internal toothed arrangement (41) but a smaller or larger number of teeth in such a way that the control gear (21) stands in meshing engagement with the inner toothed ring (20), in each case in a restricted peripheral region, and the two toothed arrangements (40, 41) have a radial spacing diametrically opposite thereto such that the control gear (21) rolls off on the inner toothed ring (20) on rotation of the belt reel (13), with the total pull-out length of the safety belt (11) corresponding to an angle of rotation of the control gear (21) relative to the axis of rotation (12) of substantially 180°; and in that the instantaneous angular position of the control gear (21) is used as a measure for the degree of draw-out of the safety belt (11).

13. Safety belt arrangement in accordance with claim 12, characterized in that a projection, in particular a pin (24), is provided on the control gear (21), with the peripheral and/or radial position of the projection being used as a measure for the degree of draw-out of the safety belt (11).

14. Safety belt arrangement in accordance with claim 12, characterized in that a signal generator is provided on the control gear (21) and a signal receiver is provided on the housing, or vice versa, and in that the instantaneous draw-out position of the safety belt (11) can be determined by determining the relative position of the signal receiver and the signal generator.

* * * * *